United States Patent [19]

Cole

[11] Patent Number: 4,475,702
[45] Date of Patent: Oct. 9, 1984

[54] VARIABLE CAMBER LEADING EDGE ASSEMBLY FOR AN AIRFOIL

[75] Inventor: James B. Cole, Mercer Island, Wash.

[73] Assignee: The Boeing Company, Seattle, Wash.

[21] Appl. No.: 474,652

[22] PCT Filed: Dec. 28, 1982

[86] PCT No.: PCT/US82/01797
§ 371 Date: Dec. 28, 1982
§ 102(e) Date: Dec. 28, 1982

[87] PCT Pub. No.: WO84/02506
PCT Pub. Date: Jul. 5, 1984

[51] Int. Cl.³ .............................................. B64C 3/48
[52] U.S. Cl. .................................. 244/214; 244/75 R; 244/219
[58] Field of Search ............... 244/213, 214, 215, 216, 244/219, 75 R

[56] References Cited

U.S. PATENT DOCUMENTS

| | | | |
|---|---|---|---|
| 1,917,428 | 7/1933 | Burnelli | 244/215 |
| 2,650,047 | 8/1953 | Carhart et al. | 244/215 |
| 3,089,666 | 5/1963 | Quenzler | 244/214 |
| 4,131,253 | 12/1978 | Zapel | 244/215 |
| 4,171,787 | 10/1979 | Zapel | 244/214 |
| 4,247,065 | 1/1981 | Grob et al. | 244/215 |

FOREIGN PATENT DOCUMENTS

| | | | |
|---|---|---|---|
| 45988 | 2/1982 | European Pat. Off. | 244/214 |
| 2006133 | 5/1979 | United Kingdom | 244/219 |

Primary Examiner—Galen L. Barefoot
Attorney, Agent, or Firm—Hughes, Barnard & Cassidy

[57] ABSTRACT

A variable camber leading edge device having a movable nose section and an upper flexible panel extending rearwardly from the nose section. To move the nose section between its upper cruise position and a high lift downwardly deflected position, there is attached to the nose section a generally arcuate cam track, having its forward and rear portions curving upwardly. The cam track is constrained to move in a generally arcuate path by means of two spaced pair of rollers, and it is driven by a pinion gear engaging an upwardly facing middle portion of the track.

3 Claims, 4 Drawing Figures

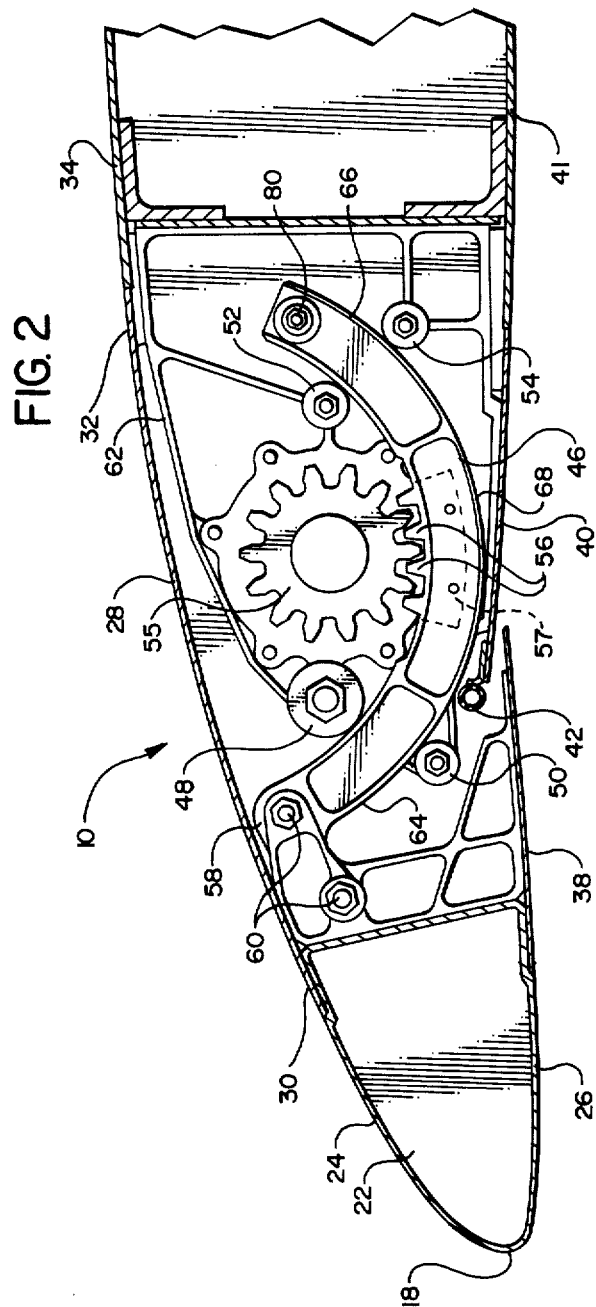

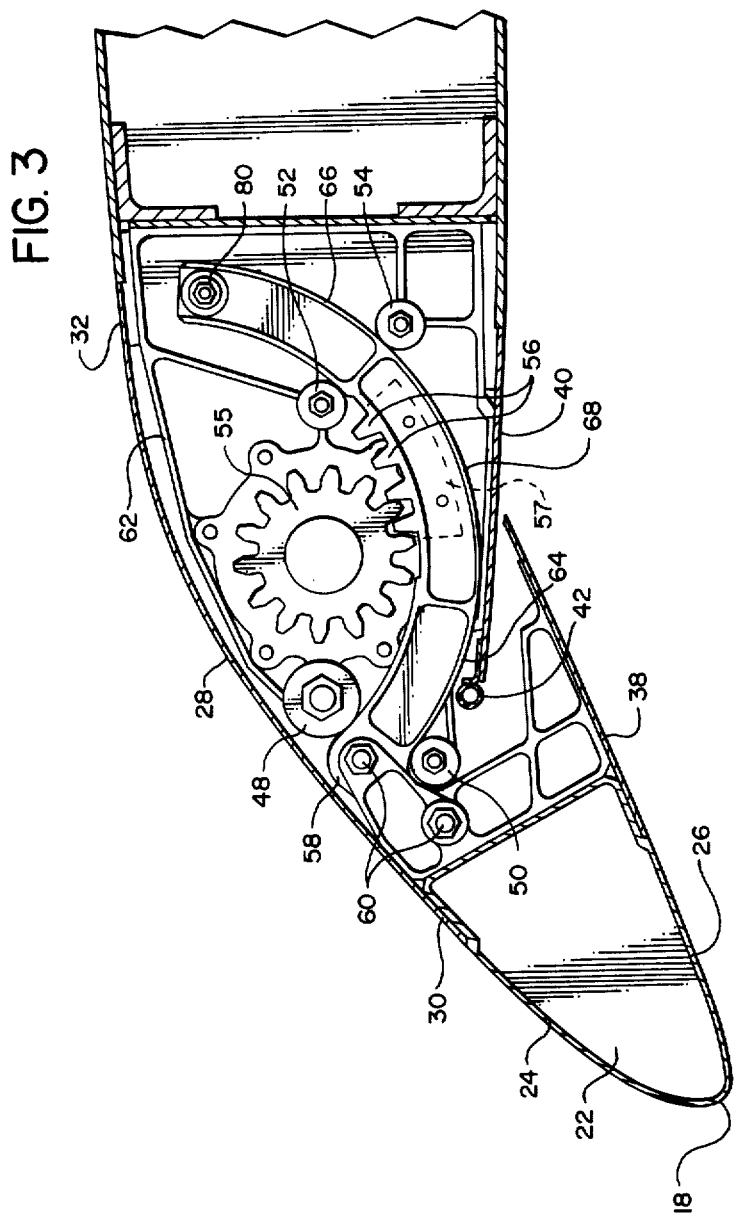

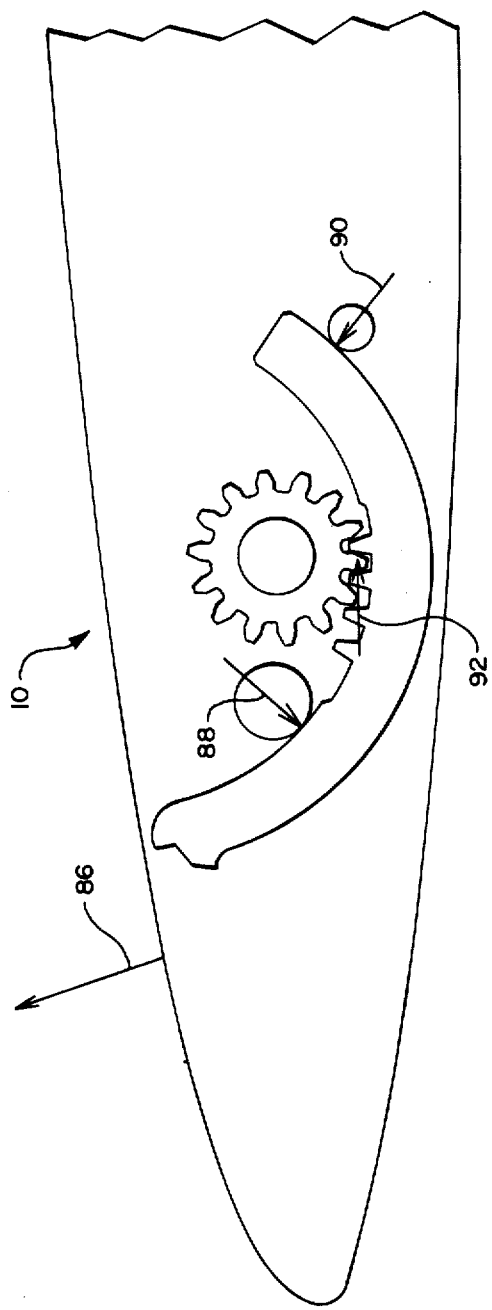

VARIABLE CAMBER LEADING EDGE ASSEMBLY FOR AN AIRFOIL

TECHNICAL FIELD

The present invention relates to airfoils, and more particularly to a variable camber leading edge assembly for an airfoil.

BACKGROUND ART

A common way of modifying the lift characteristics of an airfoil for low speed operation is to use leading edge devices which either pivot or slide outwardly from the leading edge of the airfoil to a deployed position. With many such devices, there is a problem that during deployment there is an interruption of smooth airflow over the upper surface of the airfoil. Also, many such devices are not able to be deployed to intermediate positions while maintaining the proper flow of air over the airfoil.

Accordingly, there have appeared in the prior art various devices to vary the shape of the airfoil itself in a manner to vary the camber of the leading edge. Variable camber leading edges are particularly desirable in solving the airfoil stall problem for small, thin, swept-back wings which have good cruise performance, but require high lift devices to make their low speed performance acceptable. However, there is a problem of installing such variable camber leading edge devices on such wings since these thin wings have the least space available in which to house such devices.

Accordingly, it is an object of the present invention to provide a device to vary the camber of an airfoil, and particularly such a device used as a variable camber leading edge assembly. It is a more particular object to provide such an assembly with a flexible upper skin panel which is moved from a cruise position to a more curved high lift position, with the flexible panel having a desired aerodynamic contour throughout its path of travel between the upper cruise position and the downwardly deflected position, with the assembly being relatively compact, and with the major part of the aerodynamic load on the assembly being transmitted into the support structure so as to relieve loading on the drive mechanism of the assembly.

SUMMARY OF THE INVENTION

The present invention relates to apparatus to vary the camber of an airfoil, and more particularly to such apparatus which can advantageously be used as a leading edge assembly. This assembly comprises a main support structure for the airfoil and a moveable nose section at the leading edge of the airfoil. There is an upper skin panel having a rear part connected to said main structure, a forward part connected to the nose section, and an intermediate flexible panel portion extending between the rear part and the forward part.

There is actuating means operatively connected between the nose section and the support structure to move the nose section about a general center of rotation between a first upper position where the flexible panel portion has a lesser degree of curvature and the nose is more horizontally aligned, to a second lower position where the flexible panel portion has a greater degree of curvature and the nose section is aligned in a more downward slant. This is done in a manner so that the curvature of the flexible panel portion increases with movement of the nose section toward its second position.

The actuating mean comprises a cam track connected to one of the support structure and the nose section, and also a cam track contact member connected to the other of the support structure and the nose section. The cam track has a lengthwise axis curved in a generally arcuate path about said general center of rotation. The cam track contact member and the cam track are operatively interconnected to be constrained to move relative to one another along a path generally aligned with the lengthwise axis of the cam track. There is drive means to move the cam track and the cam track contact member relative to one another to move the nose section between its first and second positions.

In the preferred form, the cam track has a forward end connected to the nose section, and the cam track engaging member is connected to the support structure. The cam track contact member engages the cam track at two space locations along the lengthwise axis to restrain angular movement of the cam track relative to the cam track contact member. Desirably, the cam track contact member comprises two roller means engaging the cam track at the spaced locations.

In the preferred form, the drive means comprises a rotatably mounted drive pinion gear engaging a cam track gear rack segment at a drive location spaced from the two support locations. Preferably the drive gear is located with its drive location positioned intermediate said two support locations. The cam track has a forward cam section contacting a forward one of the roller means in a manner to move along a path having a forward and upward slant. The cam track also comprises a rear cam section contacting a rear one of the roller means for travel along a path having an upward and rearward slant. The track has an intermediate drive section adapted to engage the drive means.

To precisely control the movement of the nose section from the first to the second position, the lengthwise axis of the cam track deviates at least partially from a true circular arc, in a manner that the center of rotation of the nose section shifts during movement of the nose section between the first and second positions. Thus, a proper aerodynamic contour of the upper skin panel can be obtained throughout the movement of the assembly. Preferably, the center of rotation shifts rearwardly during movement of the nose section from the first to the second position. Other features of the invention will become apparent from the following detailed description.

DESCRIPTION OF THE DRAWINGS

FIG. 2 is a view similar to FIG. 1, but showing the leading edge assembly in an intermediate deflected position;

FIG. 3 is a view similar to FIG. 1, but showing the leading edge assembly in its downwardly extending, high lift position; and FIG. 4 is a semischematic view similar to FIG. 1, and showing the manner in which the aerodynamic forces are reacted into the structure.

DESCRIPTION OF THE PREFERRED EMBODIMENT

Figure 1:
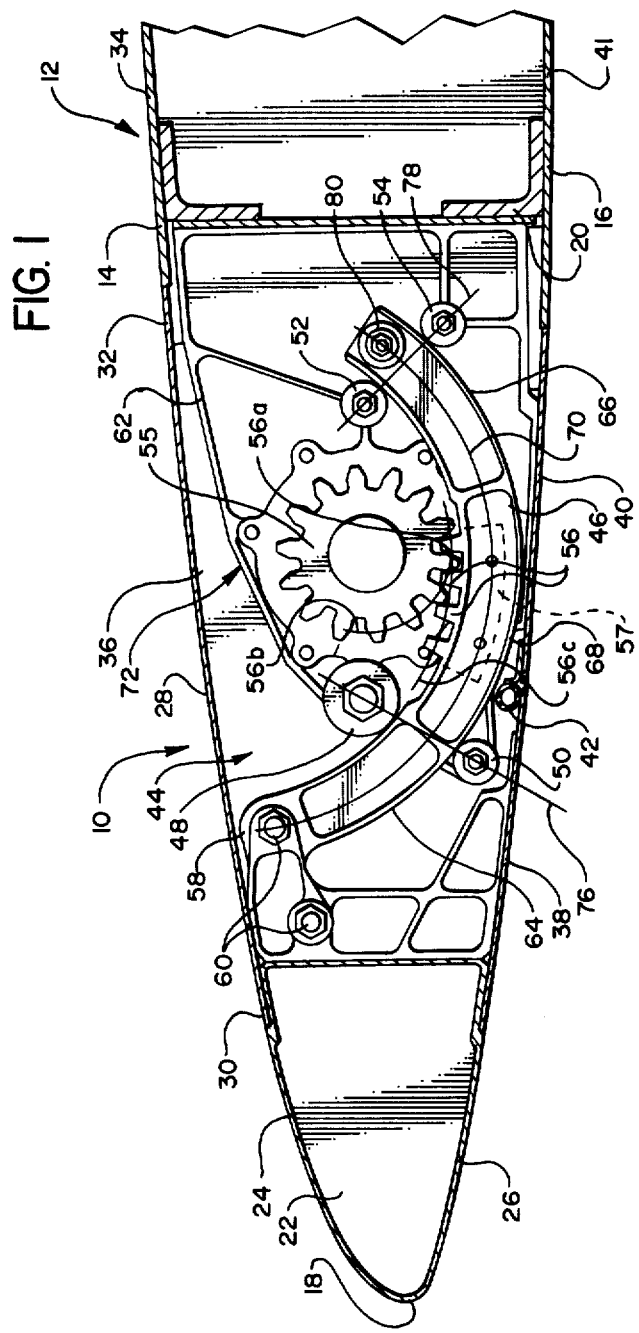
FIG. 1 is a chordwise sectional view of the leading edge assembly of the present invention in its upper position for cruise mode.

With reference to FIGS. 1 and 2, there is shown a leading edge assembly 10 which forms the forward portion of a wing 12. For convenience of illustration, only the forward portion of the wing 12 is shown. The wing 12 has an upper surface 14, a lower surface 16, a leading edge 18, and a trailing edge (not shown for ease of illustration). The wing 12 has a main support structure, comprising a front spar 20 to which the leading edge assembly 10 is mounted.

At the leading edge 18, there is a nose section 22 in the form of a substantially rigid beam extending in a spanwise direction along the wing leading edge 18. The nose section 22 has an upper surface 24 and a lower surface 26. There is a flexible upper skin panel 28 which has (a) a forward part 30 which is attached to the upper rear portion of the nose section 22 and blends into the upper surface 24 of the nose section 22; (b) a rear part 32 which butts against and is aligned with the main upper skin 34 at the location of the front spar 20, and a flexible intermediate portion 36 which reaches between the front part 30 and the rear part 32.

The lower surface of the leading edge assembly 10 comprises a forward portion 38 connected to and extending rearwardly from the lower edge of the nose section 22, and a rear portion 40 which is a forward extension of the main lower skin section 41 at the lower part of the front spar 20. At the front edge of the rear portion 40, there is a seal 42 to close the small gap at the juncture of the lower skin portions 38 and 40.

Of particular significance in the present invention is an actuating assembly, generally designated 44, which functions to move the nose section 22 from an upper cruise position shown in FIG. 1 through an intermediate position of FIG. 2, to a fully deflected high lift position, shown in FIG. 3. This is accomplished in a manner that as the assembly 10 moves from the position of FIG. 1 to that of FIG. 3, the curvature of the upper skin panel 28 progressively increases so as to assume a proper aerodynamic contour throughout the movement of the assembly 10 from its cruise configuration to its fully downwardly deflected position. During such downward movement, the forward lower skin portion 38 simply moves downwardly with the nose section 22 to separate from the rear portion 40, with the rear edge of the forward lower skin portion 38 moving rearwardly beneath the rear lower skin portion 40.

The actuating assembly 44 comprises a generally arcuately shaped cam track 46 and cam track contact means comprising forward and rear sets of rollers, the forward set being made up of upper and lower rollers 48 and 50, and the rear set being made up of upper and lower rear rollers 52 and 54. Also, there is a drive means which, in the preferred embodiment, comprises a drive gear 55 which meshes with upwardly facing gear teeth 56 at the middle portion of the cam track 46. The gear teeth are formed on a gear segment between halves of the cam track 46.

The forward end of the cam track 46 is formed with a clevis 58 which is rigidly connected to the nose section 22 through two connecting locations 60. The four rollers 48-54 are rotatably mounted to a support rib 62 which is fixedly connected to and extends forwardly from the front spar 20.

The cam track 46 can be considered as having a forward cam track section 64, a rear cam track section 66 and an intermediate drive section 68. The upper and lower surfaces of the forward cam section 64 contact the upper and lower front rollers 48 and 50, respectively. The rear cam section 66 has upper and lower surfaces which contact the upper and lower rear rollers 52 and 54, respectively. The intermediate drive section 68 is the portion of the cam track 46 having the teeth 56 that engage the drive gear 55.

The cam track 46 has a generally arcuate configuration, and has a lengthwise axis which, for purposes of illustration, has been drawn as a circular arc, indicated at 70, and having a center of curvature at 72. However, for reasons which will be explained more fully hereinafter, the lengthwise axis 70 of the track 46 deviates slightly from a true circular arc so as to program the movement of the nose section 22 more precisely so as to obtain the proper degree of curvature of the upper skin panel 28 throughout its movement from the cruise position of FIG. 1, through the intermediate position of FIG. 2 to the full down position of FIG. 3, while maintaining proper engagement of the pinion gear 55 with the gear segment teeth 56.

The rollers 48 and 50 are positioned substantially opposite one another relative to the lengthwise axis 70, as are the two rollers 52 and 54. The center axes of the rollers 48 and 50 are arranged along a line 76 that slants upwardly and rearwardly toward the center of curvature 72. The center axes of the rear rollers 52 and 54 are aligned on a line 78 that extends upwardly and forwardly toward the center of curvature 72.

In the cruise position of FIG. 1, the track 46 is at its forwardmost position, so that the forward rollers 48 and 50 engage the lower rear portion of the forward cam track section 64, and the rear rollers 52 and 54 engage the upper rear portion of the rear cam section 66. In that same position, the pinion gear 55 engages the rearwardly located teeth 56. Although not illustrated herein, it is to be understood that the two rollers 48 and 50 are arranged in a suitable support structure which has side load pads that engage lateral surfaces of the cam track 46 to keep the track 46 properly located on rollers 48 and 50. The rear rollers 52 and 54 have a similar support structure and side load pads. Further, the rear end of the track 46 has a stop member 80 which limits the forward rotation of the track 46 by engaging the side load support pads for the rear rollers 52 and 54. Likewise, the clevis 58 serves as a stop member by coming into engagement with the forward support rollers 48 and 50 when the assembly 10 is in its full down position of FIG. 3.

Also, it is to be understood that the leading edge assembly 10 is shown at only one cord length location of the wing 10. It is to be understood that there are similar assemblies 10 at other spanwise locations along the length of the wing 12. The drive gears 55 at these various locations can be interconnected by a drive shaft so as to be driven from a common power source.

In operation, to move the assembly 10 from the upper cruise position of FIG. 1, the drive gear 55 is rotated counterclockwise, as seen in FIG. 1. This causes the cam track 46 to travel in a path closely following the arc approximated by the axis 70 so that the center of rotation is relatively close to the center of curvature 72 of the arc. When the assembly 10 reaches the intermediate position of FIG. 2, the nose section 22 has moved downwardly and moderately rearwardly, and also has rotated so that it is at more of a downward and forward slant. Further, at this location the movement of the nose section 22 has been such so that the forward part 30 and rear part 32 of the skin panel 28 have moved moderately closer to one another so as to place the flexible intermediate portion 36 of the panel 28 in a rather moderate curve, as shown in FIG. 2. This curvature is such that it forms a proper aerodynamic contour of the upper skin section extending from the nose section 22 to the location of the forward spar 20. Further counterclockwise rotation of the gear 55 causes the cam track 46 to move further rearwardly in the rollers 48-54 so as to deflect the nose section 22 yet further downwardly to the position of FIG. 3.

With regard to the precise alignment of the lengthwise center axis 70 of the cam track 46, for purposes of description, let it be assumed for the moment that the lengthwise axis 70 is formed exactly in a true circular arc having a location and degree of curvature which would move the nose section 22 from the position of FIG. 1 to the fully downwardly deflected position of FIG. 3. For purposes of the following analysis, that particular circular arc shall be termed the "reference arc line". If the entire alignment of the axis 70 did correspond exactly to this reference arc line, the movement of the nose section 22 would follow generally a path which would give an unacceptably flat aerodynamic contour to the flexible skin panel 36 throughout its path of travel from the full up position to the fully downwardly deflected position, because the center of rotation would coincide exactly with the center of curvature 72.

However, to fine tune the movement of the nose section 22 to obtain the desired aerodynamic contour of the panel 36 more precisely throughout the path of travel of the nose section 22, it is desirable to position the middle portion of the forward cam track section 64 moderately outwardly from the arc reference line. Thus, during movement of the nose section 22 from the position of FIG. 1 toward the intermediate position of FIG. 2, the center of rotation of the nose section 22 shifts a moderate distance rearwardly in a manner to increase the amount of curvature of the flexible panel section 36 to a moderate degree more than it would be otherwise for that particular location on its path of travel.

However, it must be kept in mind that the movement of the intermediate drive section 68 must be such that the gear teeth 56 remain in proper meshing engagement with the teeth of the drive gear 55. This requires that the positioning of that portion of the axis 70 that passes through the rear portion 66 of the cam track 46 be shifted from the reference arc line in a manner to compensate for the shifting of the forward cam track section 64 from the reference arc line. Thus, where the forward cam section would have a portion thereof positioned moderately radially outwardly relative to the center of curvature 72, the corresponding portion of the rear section 66 (i.e. the portion which would be engaged by the rear rollers 52 and 54 at the same time that the portion of the forward section 64 was engaged by the forward rollers 48 and 50) would be positioned radially inwardly to a moderate extent. This would give the entire cam track 46 what might be described as a slight rocking motion as it moves in a generally arcuate path from the full forward position in FIG. 1 to the full rear position of FIG. 3. This slight rocking motion would be about a pivot axis which is at the tangent point 56a of the two gear pitch circles, indicated at 56b and 56c.

The axis 70 is contoured in a manner that the center of rotation about which the nose section 22 moves shifts generally rearwardly during movement of the nose section 22 from the position of FIG. 1 to the position of FIG. 3.

The kinematic program provided by the cam track 46 is one in which the arc height of the upper skin panel 28 is increased in a linear manner, with the gear teeth 56 held in proper mesh on the pitch circles of the gear 55 and the gear rack 57 as the nose section 22 is deflected from the cruise position of FIG. 1 to the fully downwardly deflected position of FIG. 3. This program is tailored to insure that no curvature reversal occurs in the panel 28 throughout its full bending excursion, since such curvature reversal would compromise its fatigue life.

To explain yet another facet of the present invention, reference is made to FIG. 4 which shows an arrow 86 that represents the net lift component exerted on the leading edge assembly 10 as the result of aerodynamic loads imposed on the wing 10 when cruising at design speed. It can be seen that the net force component is generally upward and moderately forward so as to tend to pull the nose section 22 upwardly. In the particular configuration shown herein, these loads are reacted in a manner that approximately 60% of the loads are transmitted from the track 46 directly into the rollers. More precisely, the forward upper roller 48 exerts a downward and forward force component 88 normal to the plane of surface contact of the roller 48 with the upper surface of the cam track 46. The lower rear roller 54 exerts a forward and upward force component 90, which component 90 is normal to the plane of surface contact of the roller 54 with the lower surface of the track 46. The two force components 88 and 90 provide resistance to the upward movement of the nose section 22, but create a resultant force component 92 in a forward direction so as to tend to move the track 46 forwardly. This forward force component 92 is resisted by the gear 55 engaging the teeth 56. However, since the force component 92 is only about 40% of the aerodynamic force 86, the drive components for the gear 55 and the gear itself can be made smaller and lighter, than it would be if it were required to react against a greater proportion of the aerodynamic load.

As the assembly 10 is moved downwardly, the aerodynamic loads tending to pull the nose section 22 upwardly become somewhat less. Thus, the force component illustrated in FIG. 4 represents the maximum load condition on the assembly 10.

While the present invention is particularly adapted to be used in, and to uniquely resolve the problems of, a variable camber leading edge assembly of an airfoil, within the broader aspects of the present invention, it could be utilized in other arrangements relative to an airfoil or similar device. Specifically, in the following claims, it is to be understood that while this assembly is recited as a leading edge assembly, the term "leading edge assembly" is to be interpreted broadly enough to refer to an assembly positioned at the trailing edge of an airfoil, in which case the terms "forward" and "rear" would simply be reversed within the meaning of the claims. Also, it is to be understood that various modifications could be made without departing from the basic teachings of the present invention.

I claim:

1. A leading edge assembly for an airfoil having an upper surface, a lower surface, a leading edge and a trailing edge, said assembly comprising:
   a. a main support structure for the airfoil;
   b. a nose section at said leading edge;
   c. an upper skin panel having a rear part connected to said structure, a forward part connected to said nose section, and an intermediate flexible panel portion extending between the rear part and the forward part;
   d. actuating means operatively connected between said nose section and said support structure to move said nose section about a general center of rotation between a first upper position where the flexible panel portion has a lesser degree of curvature and said nose is more horizontally aligned, to a second lower position where the flexible panel portion has a greater degree of curvature and the nose section is aligned in a more downward slant, in a manner that curvature of the flexible panel portion increases with movement of the nose section toward its second position, said actuating means comprising a cam track connected to said nose section, and a cam track contact member connected to said support structure, said cam track having a lengthwise axis curved in a generally arcuate path about said general center of rotation, said cam track contact member and said cam track being operatively interconnected to be constrained to move relative to one another along a path aligned with the lengthwise axis;
   e. said cam track having a forward end connected to said nose section, said cam track contact member having two contact portions contacting said cam track at two spaced locations along the lengthwise axis to restrain angular movement of the cam track relative to the cam track contact member;
   f. drive means to move the cam track and the cam track engaging member relative to one another to move the nose section between its first and second positions;
   g. said drive means comprising a rotatably mounted drive gear engaging said cam track at a drive location spaced from said two support locations and positioned intermediate said support locations;
   h. said cam track having a forward cam section engaging a forward one of said contact portions in a manner to move along a path having a forward and upward slant, and a rear cam section engaging a rear one of said contact portions for travel along a path having an upward and rearward slant; and
   i. the general center of rotation of said cam track being positioned at an upper part of said assembly between the forward and rear parts of said upper skin panel, the lengthwise axis of the forward and rear cam sections of said cam track deviating at least partially from a true circular arc, in a manner that said general center of rotation shifts during movement of the nose section between the first and second positions, whereby a proper aerodynamic contour of said upper skin panel can be obtained.

2. The assembly as recited in claim 1, wherein said two contact portions comprise two roller means contacting said cam track at said spaced locations.

3. The assembly as recited in claim 1, wherein the lengthwise axis of said cam track is contoured to cause said general center of rotation to shift rearwardly during movement of said nose section from said first position to said second position.

* * * * *